United States Patent
Gokhale et al.

(10) Patent No.: US 9,667,486 B2
(45) Date of Patent: May 30, 2017

(54) SYSTEM AND METHOD FOR NETWORK ADDRESS ADMINISTRATION AND MANAGEMENT IN FEDERATED CLOUD COMPUTING NETWORKS

(71) Applicant: VMware, Inc., Palo Alto, CA (US)

(72) Inventors: Aditya Gokhale, Pune (IN); Abhinav Vijay Bhagwat, Pune (IN)

(73) Assignee: VMware, Inc., Palo Alto, CA (US)

( * ) Notice: Subject to any disclaimer, the term of this patent is extended or adjusted under 35 U.S.C. 154(b) by 665 days.

(21) Appl. No.: 14/014,389

(22) Filed: Aug. 30, 2013

(65) Prior Publication Data
US 2015/0067112 A1    Mar. 5, 2015

(51) Int. Cl.
*H04L 12/24* (2006.01)
*H04L 29/12* (2006.01)

(52) U.S. Cl.
CPC ...... *H04L 41/0809* (2013.01); *H04L 61/2007* (2013.01); *H04L 61/2046* (2013.01)

(58) Field of Classification Search
CPC ............. H04L 63/0272; H04L 65/4084; H04L 67/141; H04L 61/2046; H04L 61/6022
See application file for complete search history.

(56) References Cited

U.S. PATENT DOCUMENTS

| | | | | |
|---|---|---|---|---|
| 7,467,408 B1 * | 12/2008 | O'Toole, Jr. | ......... | H04L 63/145 726/13 |
| 8,458,786 B1 * | 6/2013 | Kailash | ............. | H04L 63/0272 709/220 |
| 2004/0109457 A1 * | 6/2004 | Johnson | ................. | H04L 45/08 370/401 |
| 2009/0182858 A1 * | 7/2009 | Zhou | ....................... | H04L 12/46 709/223 |
| 2010/0058051 A1 * | 3/2010 | Imai | .................... | G06F 9/45537 713/152 |
| 2010/0077064 A1 * | 3/2010 | Viger | ................. | H04L 12/4633 709/221 |
| 2012/0036231 A1 * | 2/2012 | Thakur | .................. | H04L 45/00 709/220 |
| 2012/0281706 A1 * | 11/2012 | Agarwal | ............ | H04L 67/1002 370/395.53 |
| 2012/0281708 A1 * | 11/2012 | Chauhan | ............ | H04L 63/0272 370/401 |
| 2014/0161047 A1 * | 6/2014 | Pularikkal | .......... | H04W 76/025 370/329 |

* cited by examiner

*Primary Examiner* — John Macilwinen
*Assistant Examiner* — Christopher Cadorna (57) ABSTRACT

Techniques for performing network address allocation, administration and management in federated cloud computing networks are described. In one example embodiment, network interface cards (NICs) in a local network services appliance and a remote network services appliance register with an associated local network cloud and remote network cloud in the federated cloud computing networks. The local cloud network and the remote cloud network are then configured to send packets with unclaimed network address to the associated registered NICs. A layer-2 (L2) network tunnel including a data channel and a control channel is then formed between the local network services appliance and the remote network services appliance by stitching the local cloud network and the remote cloud network. Network address allocation, administration and management in the federated cloud computing networks are then performed using the formed L2 network tunnel.

30 Claims, 3 Drawing Sheets

SYSTEM AND METHOD FOR NETWORK ADDRESS ADMINISTRATION AND MANAGEMENT IN FEDERATED CLOUD COMPUTING NETWORKS

BACKGROUND

Federated computing is an approach to an enterprise architecture that allows interoperability between semi-autonomous decentralized lines of businesses, information technology systems, and applications. Typically, this is achieved by coordinated sharing and exchange of information which is organized by models, which describe common concepts and behavior. A federated cloud computing is the deployment and management of multiple external and internal services to match business needs. A federation is a union of several smaller parts that perform a common action.

Cloud computing is the provision of dynamically scalable and often virtualized resources as a service over the Internet on a utility basis. Users do not have to have any knowledge of, expertise in, or control over the technology infrastructure in the "cloud" that supports them. Typically, users only pay for what they use, and can increase and decrease usage at any minute. Cloud computing services often provide common business applications online that are accessed from a web browser, while the software and data are stored on the servers.

Cloud computing customers do not generally own the physical infrastructure serving as host to the software platform in question. They typically consume resources as a service and pay only for resources that they use. The majority of cloud computing infrastructures consist of reliable services delivered through data centers and built on servers employing various virtualization technologies. The services are accessible anywhere that provides access to networking infrastructure. Clouds often appear as single points of access for all consumers' computing needs.

A virtual machine (VM) is a software abstraction of a physical computer system. Each VM may function as a self-contained platform, running its own guest operating system (OS) and guest software applications (processes). Virtualization software manages physical computer resources and redirects input/outputs (TO) from each VM running on the physical computing system from virtual devices provided by the virtualization software to underlying physical resources. Because VMs, as software constructs, are relatively easy to create, manage, and destroy, they are commonly used to provide computing resources in cloud computing environments.

Existing technology allows VMs to migrate from one cloud to the other. Each cloud is a collection of managed infrastructure supporting deployment and management of workloads such as VMs. One current solution establishes a layer-2 (L2) network tunnel between a private cloud and a public cloud, referred to as a stitched L2 network for inter-cloud VM workload migration. However, such a stitched network may not perform the needed Internet protocol allocation, Internet Protocol administration and management (IPAM), which can result in Internet protocol (IP) conflicts and/or duplicate IP addresses. Further, the above solution may form new IP addresses for devices located in the remote cloud that are within the same range, as that of the devices that are located in local cloud before they expire due to lack of communication between the remotely located machine and the local machine. Furthermore, the above solution may not reserve leases or expire them on a remote cloud. In addition, the above solution may not generate reports for IP addresses rolled out at a remote cloud. Also, the above solution may not delegate IPAM to remote server. Moreover, the above solution may not support dynamic host configuration protocol (DHCP) and may not perform location aware packet routing (domain name system (DNS), Internet traffic steering, file transfer protocol (FTP), file share and the like).

DETAILED DESCRIPTION

Embodiments described herein provide enhanced computer- and network-based methods, techniques, and systems for performing network address allocation, administration and management in federated cloud computing networks. The network address allocation, administration and management of federated cloud computing networks includes redirecting all incoming packets with unclaimed network address by the local network services appliance to remote network services appliance and vice versa and sharing network address management information with remote network services appliance. Further, the local and remote network service appliances can share, negotiate, broadcast internet protocol (IP) allocation requests to avoid allocating duplicate IPs, assign new network addresses to virtual machines (VMs) by requesting a network address from a master arbitrator, assign new network addresses to VMs by blocking an IP address from a delegated range and communicating it back to the master arbitrator, expire leases on relinquished network addresses or renew leases on existing network addresses, unallocate network address blocks for VMs that are no longer available/deleted/suspended/network interface card (NIC) deleted, address remote dynamic host configuration protocol (DHCP) requests, and perform location aware packet routing. In this embodiment, the master arbitrator frees network address blocks for VMs that are no longer available/deleted/suspended/NIC deleted.

Example embodiments provide an admin/communication engine that performs at least some of the described techniques. In one embodiment, the admin/communication engine registers NICs in the local network services appliance and the remote network services appliance with the local cloud network and remote cloud network, respectively, for redirecting the incoming packets with unclaimed network address to the remote network services appliance and vice versa. The admin/communication engine then forms a layer-2 (L2) network tunnel including a data channel and a control channel between the local network services appliance and the remote network services appliance by stitching the local cloud network and the remote cloud network upon registering the NICs in the local network services appliance and the remote network services appliance for performing the network address allocation, administration and management in the federated cloud computing networks via the formed control channel in the L2 network tunnel. The admin/communication engine may then obtain the incoming packets with unclaimed network address from the local cloud network and tunnel the obtained packets via the formed data channel in the L2 network tunnel to the remote network services appliance and vice versa.

System Overview and Examples of Operation

Figure 1:
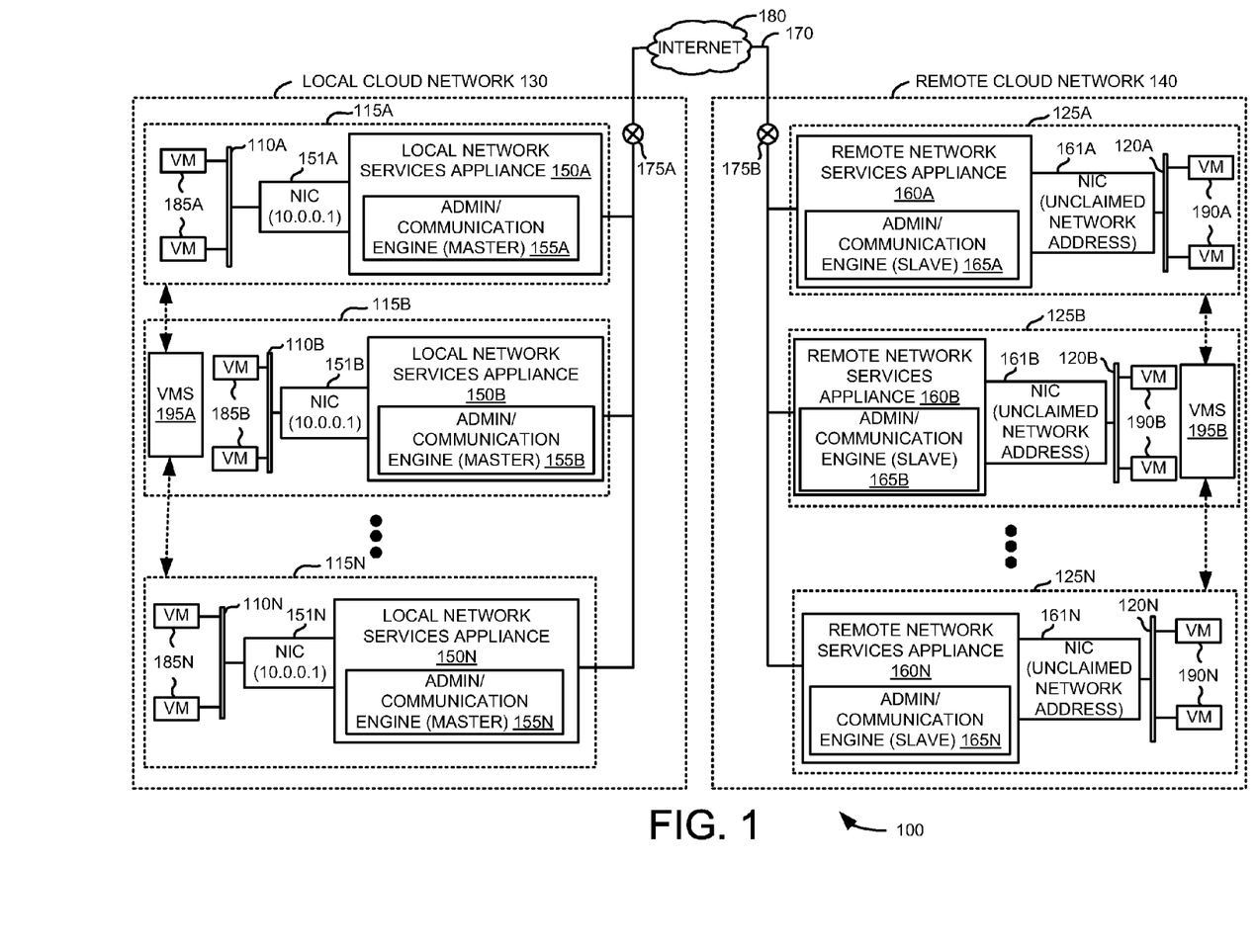
FIG. 1 is a block diagram illustrating federated cloud computing networks including a system for performing network address allocation, administration and management, according to an example embodiment.

FIG. 1 is a block diagram illustrating system 100 for performing network address allocation, administration and management in federated cloud computing networks, according to an example embodiment. As shown in FIG. 1, system 100 includes local cloud network 130 and remote cloud network 140. Local cloud network 130 and remote cloud network 140 may be datacenters including both physical and virtual networks. Further as shown in FIG. 1 local cloud network 130 and remote cloud network 140 include physical computing systems 115A-N and 125 A-N hosting associated VMs 185A-N and 190 A-N, respectively. Further as shown in FIG. 1, local subnets 110 A-N and remote subnets 120 A-N are virtual networks overlaid on a physical network associated with VMs 185 A-N and 190 A-N, respectively. Furthermore as shown in FIG. 1, each of local cloud network 130 and remote cloud network 140 includes virtual management software (VMS) 195 A and 195B that is communicatively coupled to physical computing systems 115A-N and 125 A-N hosting associated VMs 185A-N and 190 A-N, respectively.

Also as shown in FIG. 1, local network services appliances 150A-N are communicatively coupled between router 175A and associated local subnets 110 A-N. Furthermore as shown in FIG. 1, remote network services appliances 160 A-N are communicatively coupled between router 175B and associated remote subnets 120 A-N. Routers 175 A and 175B may be realized as physical routers or virtual routers. Virtual routers may be realized as virtual appliances or virtual switches embedded with appropriate routing logic. Furthermore as shown in FIG. 1, local and remote network services appliances 150 A-N and 160 A-N include associated admin/communication engines 155A-N and 165 A-N, respectively. Although in the example embodiment shown in FIG. 1, admin/communication engines 155A-N are shown acting as masters and admin/communication engines 165 A-N are shown acting as slaves, based on the operation, one can envision that the roles of masters and slaves can be vice versa. Moreover, in one embodiment, admin/communication engines 155A-N and 165 A-N are exactly same and are capable of acting as masters and/or slaves based on the operational needs of system 100. Also, one skilled in the art can envision that local and remote network services appliances 150 A-N and 160 A-N may be realized as physical appliances or virtual appliances.

In addition as shown in FIG. 1, L2 network tunnel 170 including data and control channels (not separately shown) communicatively couples local cloud network 130 and remote cloud network 140 via Internet (or network fabric) 180 by stitching local network services appliances 150 A-N and remote network services appliances 160 A-N. Moreover VMs 185 A-N and 190 A-N are part of virtual networks in the local subnets 110 A-N and remote subnets 120 A-N are communicatively connected to local network services appliances 150 A-N and remote network services appliances 160 A-N, respectively. For example, as shown in FIG. 1, 10.0.0.1 are virtual network addresses for network interface cards (NICs) 151 A-N are not visible outside of local subnets 110 A-N. In this example, for one VM to send a packet to another VM, which has an IP address 10.0.0.0/24 in each of local subnets 110 A-N, the packet needs to be wrapped in an outer packet by associated local network services appliances 150 A-N. Further in this example, the local network services appliances 150 A-N encapsulates outgoing packets and de-encapsulates incoming packets, so that the VMs 185 A-N only see the virtual network in local subnets 110 A-N although, the physical locations of the VMs 185 A-N may be completely arbitrary. Example L2 network tunnel 170 is a VLAN on a physical network. Furthermore in this example, each of local network services appliances 150 A-N and remote network services appliance 160 A-N identifies all the other entities on the respective local subnets 110 A-N and remote subnets 120 A-N, respectively. Further each of local network services appliances 150 A-N and remote network services appliance 160 A-N is configured to receive multicast, unicast, and/or unknown unicast traffic for forwarding to any other network services appliance that may host the targeted VM according to the registration. In addition, each of VMs 185 A-N may reside on same or different physical hosts 115 A-N within local cloud network 130. Similarly, each of VMs 190 A-N may reside on same or different physical hosts 125 A-N within remote cloud network 140.

In operation, admin/communication engines 155A-N or 165 A-N residing in one of local or remote network services appliances, 150 A-N and 160 A-N, respectively, and acting as a master arbitrator, registers NICs 151 A-N and 161 A-N disposed in local network services appliances 150 A-N and remote network services appliances 160 A-N with local cloud network 130 and remote cloud network 140, respectively. Registering a NIC to a network is well known in the art and may be performed using any of the well known registration processes.

Further in operation, admin/communication engines 155A-N or 165 A-N then configures local cloud network 130 and remote cloud network 140 to send packets with unclaimed network address to associated registered NICs 151 A-N and 161 A-N of local network services appliances 150 A-N and remote network services appliances 160 A-N. Configuring a network to send all the packets with unclaimed network address, for example, a media access control (MAC) address, can be performed using various known techniques. In a network, a network switch connects all physical devices. For example, registering a NIC to a network typically means connecting the NIC of a physical machine to the network switch using an Ethernet cable. Network switches have ports for connecting the NICs via an Ethernet cable. Typically, each NIC may have a unique MAC address (also referred to as L2 address). Connecting a NIC to a network switch port via the Ethernet cable also means that the MAC address of the NIC is communicated to the network switch. This association of network switch's port and NIC's MAC address is also well known as MAC learning and a table in which this association information is stored in the network switch is generally referred to as a MAC learning table. Therefore, when a packet arrives at a network switch via any other network switch port and has a destination MAC address then it will be sent to the associated NIC via the connected network switch port which the network switch has associated in the MAC learning table. Any packet that comes to the network switch having a destination MAC address that the network switch has not learned is referred to as "packet with unclaimed MAC address". In a virtual environment, the NIC, the network switch, ports of the network switch and the Ethernet cable are all virtual and configuring properties of the network, in such a virtual environment, typically refers to configuring properties of the network switch. For example, VMware's DVS™ (Distributed Virtual Switch) provides a property called as "SINK PORT". A switch port to which the NIC of a computing device is connected may be set with this property. When a packet with unclaimed MAC address arrives at the network switch, the packet is then sent to the port to which SINK PORT property is set to "true" state.

Admin/communication engines 155A_N acting as the master arbitrator forms L2 network tunnel 170 including the data channel and the control channel between associated local network services appliances 150 A-N and remote network services appliances 160 A-N by stitching local cloud network 130 and remote cloud network 140 upon registering and configuring associated NICs 151 A-N and 161 A-N in local network services appliances 150 A-N and remote network services appliances 160 A-N. The process of stitching refers to the local edge router placing a packet, such as the one described above with reference to registering and configuring, over a formed tunnel, such as the L2 network tunnel 170 and sending it to a remote edge router. The remote edge router then sends the received packet to a remote network switch. If there is a network device including a NIC having a MAC address same as the destination MAC address in the packet, the remote network switch learns the MAC address of that network device. When the remote network switch receives the packet from the remote edge router it already knows that this packet needs to be sent via the associated port based on its associated MAC learning table. This is generally how a packet reaches from a physical machine in the local cloud network to a machine in the remote cloud network.

Admin/communication engines 155A-N acting as the master arbitrators then perform the network address allocation, administration and management in the federated cloud computing networks using the formed control channel of L2 network tunnel 170 via Internet 180. Exemplary network address includes an IP address, a MAC address and the like. Exemplary control channel in the L2 network tunnel 170 includes a secure socket layer (SSL) virtual private network (VPN) tunnel and the like. Example local and remote network services appliance include an edge router, edge gateway and the like. For example, formed L2 network tunnel 170 including the data channel and the control channel is capable of carrying both data signals and control signals for migrating VMs 185 A-N from local cloud network 130 to remote cloud network 140. Further, admin/communication engines 155A-N acting as the master arbitrators allow allocation, administration, and management of VMs VM1-VMN between local cloud network 130 and remote cloud network 140. Example network address administration and management information includes IP address administration and management (IPAM) information and/or MAC address administration and management information.

Further in operation, each of admin/communication engines 155A-N obtains the incoming packets with unclaimed network address from local cloud network 130 and tunnels the obtained packets, via the formed data channel in L2 network tunnel 170, to associated one of remote network services appliances 160 A-N. Similarly, each of admin/communication engines 155B obtains the incoming packets with unclaimed network address from remote cloud network 140 and tunnels the obtained packets, via the formed data channel in L2 network tunnel 170, to associated one of local network services appliances 150 A-N.

Furthermore in operation, one of local network services appliances 150 A-N and remote network services appliances 160 A-N taking on a master arbitrator role, shares, negotiates, and/or broadcasts network address allocation requests and ensures non-allocation of duplicate network addresses in local cloud network 130 and remote cloud network 140 via the control channel in L2 network tunnel 170. In some embodiments, the master arbitrator shares the network address administration and management information between local network services appliances 150 A-N and associated remote network services appliances 160 A-N via formed control channel in L2 network tunnel 170.

In some embodiments, any of admin/communication engines 155A_N acting as the master arbitrator assigns new network addresses to VMs 185 A-N in local cloud network 130 and/or remote cloud network 140 upon receiving a request from associated one of remote network services appliances 160 A-N not acting as the master arbitrator.

In some embodiments, any of admin/communication engines 155A-N acting as master arbitrator assigns new network addresses to VMs 185 A-N in local cloud network 130 and/or remote cloud network 140 by blocking a network address from a delegated range upon receiving a request from admin/communication engine 155B residing in associated one of remote network services appliances 160 A-N not acting as the master arbitrator.

In some embodiments, any of admin/communication engines 155A-N acting as the master arbitrator expires leases of relinquished network addresses and renews leases of any existing network addresses. Further in some embodiments, any of admin/communication engines 155A-N acting as the master arbitrator unallocates network address blocks for VMs 185 A-N that are no longer available, deleted, suspended and/or for which the NIC deleted by the master arbitrator via the control channel in L2 network tunnel 170.

Furthermore in some embodiments, any of admin/communication engines 155A-N acting as the master arbitrator addresses remote DHCP requests via the control channel in L2 network tunnel 170. Also in some embodiments, any of admin/communication engines 155A-N acting as the master arbitrator resolves names locally, if local domain name system (DNS) cache has a forwarding network, via the control channel in L2 network tunnel 170. In addition, any of admin/communication engines 155A-N acting as the master arbitrator routes the packets to Internet 180 via a local Internet gateway. Also in these embodiments, any of admin/communication engines 155A-N acting as the master arbitrator routes file transfer protocol (FTP)/file share requests to an available local server.

One skilled in the art can envision that the above described IP allocation and expiration, DNS resolution, addressing DHCP requests and the like can be implemented using well known protocols.

Also, although certain terms are used primarily herein, other terms could be used interchangeably to yield equivalent embodiments and examples. For example, the term "physical computing system" may be used interchangeably with "physical machine" or "physical device". Likewise, the terms "local cloud network" and "remote cloud network" are well-known and that equivalent terms such as "local data center" and "remote data center", respectively, could be substituted. Further for example, it is well-known that equivalent terms in the field of system virtualization or similar or related fields could be substituted for such terms as "physical computer," "hypervisor," "virtual machine," or the like. Further, the terms "data channel" and "control channel" may be used interchangeably with "data path" and "control path" and "data signal" and "control signal", respectively.

Numerous specific details are set forth herein, such as data formats and code sequences, and the like, in order to provide a thorough understanding of the described techniques. The embodiments described also can be practiced without some of the specific details described herein, or with other specific details, such as changes with respect to the ordering of the logic, different logic, different architectures, or the like. Thus, the scopes of the techniques and/or functions described are not limited by the particular order, selection, or decomposition of aspects described with reference to any particular routine, module, component, or the like.

Example Processes

Figure 2:
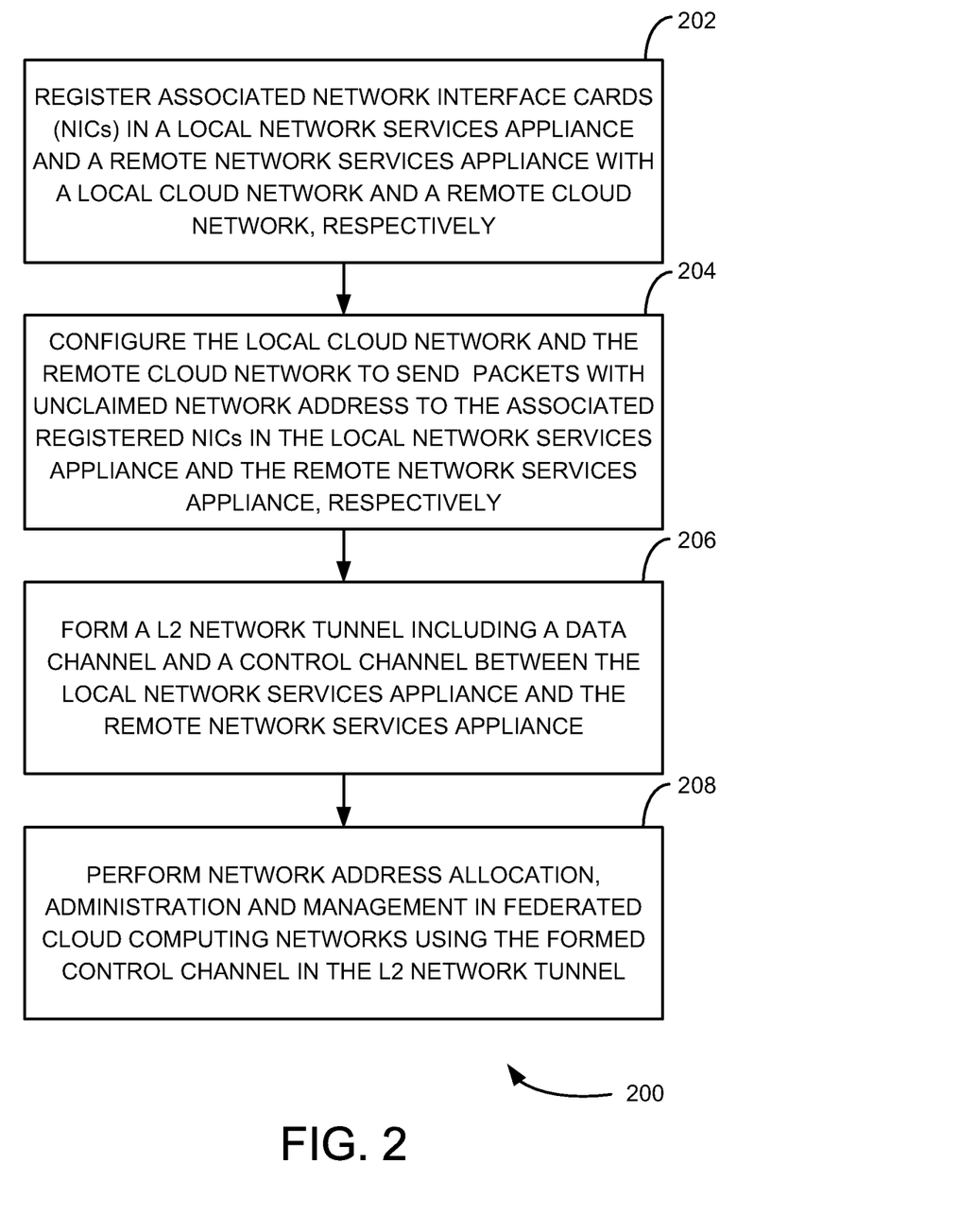
FIG. 2 is a flow diagram of a process for performing network address allocation, administration and management in federated cloud computing networks, according to an example embodiment.

FIG. 2 is a flow diagram of a process 200 for performing network address allocation, administration and management in federated cloud computing networks, according to an example embodiment. FIG. 2 illustrates the network address allocation, administration and management in the federated cloud computing networks that may be performed by, for example, one or more modules of an admin/communication engine described above. The illustrated process 200 dynamically and/or statically allocates, administers, and manages network address in the federated cloud computing networks.

At block 202, process 200 registers NICs in a local network services appliance and a remote network services appliance with a local cloud network and a remote cloud network, respectively. For example, the local and remote network services appliances include an edge router, edge gateway and the like. In one example, the local cloud network and the remote cloud network have one or more physical computing systems hosting multiple VMs.

At block 204, process 200 configures the local cloud network and the remote cloud network to send incoming packets with unclaimed network address to the associated registered NICs in the local network services appliance and the remote network services appliance.

At block 206, process 200 forms a L2 network tunnel including a data channel and a control channel between the local network services appliance and the remote network services appliance by stitching the local cloud network and the remote cloud network upon registering and configuring the NICs in the local network services appliance and the remote network services appliance.

At block 208, process 200 performs the network address allocation, administration and management in the federated cloud computing networks using the formed control channel in the L2 network tunnel. Exemplary network address includes an IP address, a MAC address and the like. Exemplary control channel in the L2 network tunnel includes a SSL VPN tunnel and the like. For example, the formed L2 network tunnel including the data channel and the control channel is capable of carrying both data signals and control signals. The L2 network tunnel including the data channel and the control channel facilitates migration of VMs from the local cloud network to the remote cloud network. Further, allows allocation, administration, and management of the VMs between the local cloud network and the remote cloud network. Exemplary network address administration and management information includes IP address administration and management (IPAM) information and/or media access control (MAC) address administration and management information.

Process 200 may perform additional operations. For example, after block 208, according to process 200, the admin/communication engine obtains the incoming packets with unclaimed network address from the local cloud network and tunnels the obtained packets, via the formed data channel in the L2 network tunnel, to the remote network services appliance by the local network services appliance. Similarly, accordingly to process 200, the admin/communication engine obtains the incoming packets with unclaimed network address from the remote cloud network and tunnels the obtained packets, via the formed data channel in the L2 network tunnel, to the local network services appliance by the remote network services appliance.

As another example, process 200 may assign a master arbitrator role to one of the local network services appliance and the remote network services appliance for sharing, negotiating, and/or broadcasting network address allocation requests and for ensuring non-allocation of duplicate network addresses in the local cloud network and the remote cloud network via the control channel in the L2 network tunnel. As another example, process 200 may share the network address administration and management information between the local network services appliance and the remote network services appliance via the formed control channel in the L2 network tunnel.

Process 200 for performing network address allocation, administration and management in the federated cloud computing networks is explained in more detail above with reference to the system diagram in FIG. 1.

Example Computing System Implementation

Figure 3:
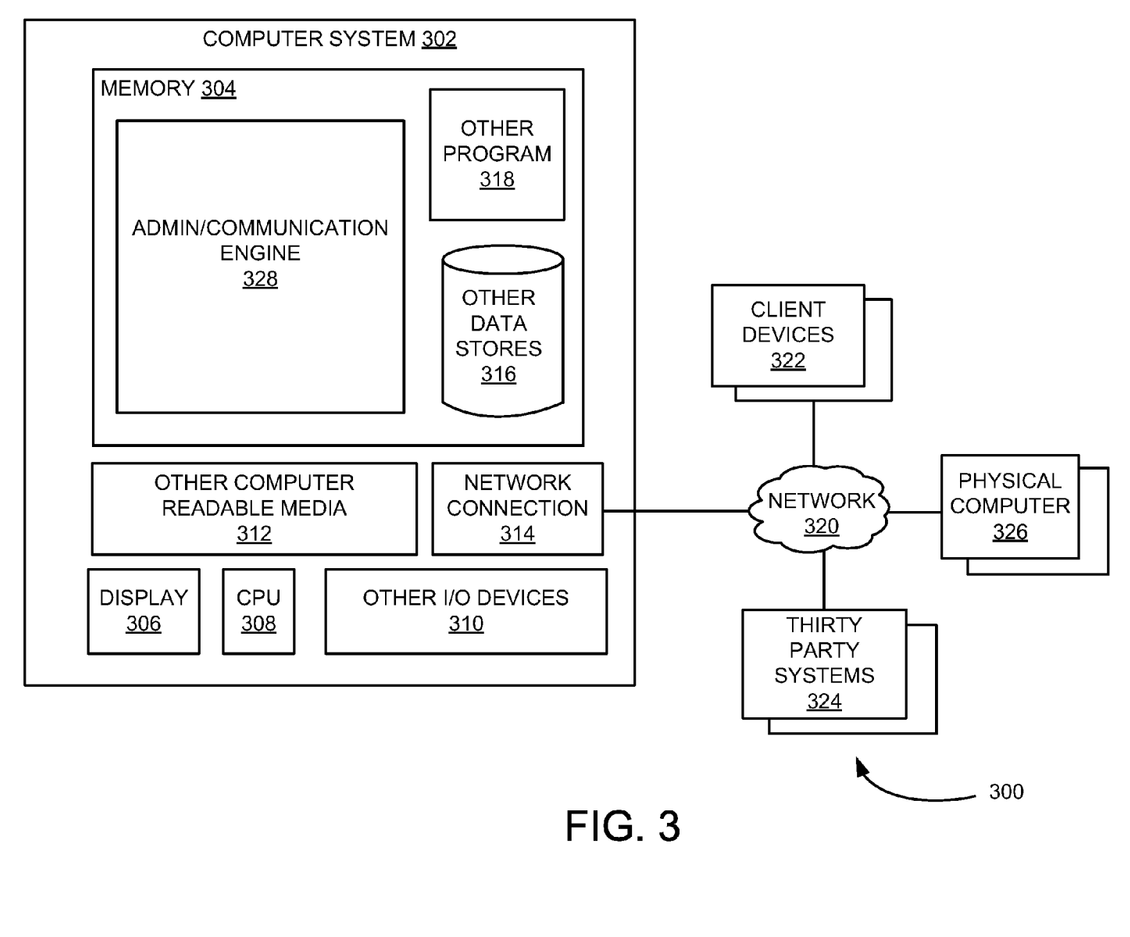
FIG. 3 is a block diagram of a computing system for implementing network address allocation, administration and management in federated cloud computing networks, according to an example embodiment.

FIG. 3 is block diagram 300 of an example computing system for performing network address allocation, administration and management in federated cloud computing networks, according to an example embodiment. In particular, FIG. 3 shows computing system 302 that may be utilized to implement admin/communication engine 155 (e.g., admin/communication engines 155A and 155B shown in FIG. 1). The admin/communication engine 155 may be implemented in software, hardware, firmware, or in some combination to achieve the capabilities described herein.

In the embodiment shown, computing system 302 may comprise computer memory ("memory") 304, display 306, one or more central processing units ("CPU") 308, Input/Output devices 310 (e.g., a keyboard, a mouse, etc.), other computer-readable media 312, and network connections 314. Admin/communication engine 155 is shown residing in memory 304. The components of admin/communication engine 155 may execute on one or more CPUs 308 and implement techniques described herein. Other code or programs 318 (e.g., an administrative interface, a Web server, and the like) and potentially other data repositories, such as data store 316, may also reside in memory 304, and execute on one or more CPUs 308. One or more of the components in FIG. 3 may not be present in any specific implementation. For example, some embodiments may not provide other computer readable media 312 or display 306.

Admin/communication engine 155 interacts via network 320 with client devices 322, physical computers 326, and/or third-party systems/applications 324. The third-party systems/applications 355 may include any systems that provide data to, or utilize data from, admin/communication engine 155, including remote management/monitoring consoles, performance profilers, activity trackers, or the like.

As discussed, admin/communication engine 155 dynamically allocates, administers, and manages network address in federated cloud computing network (FIG. 1) amongst multiple VMs executing thereon.

The architecture shown in FIG. 3 may in some embodiments be partially or fully virtualized. For example, computer system 302 may be one or possibly many VMs executing on physical hardware and managed by a hypervisor, virtual machine monitor, or similar technology. Also, physical computers 326 may include virtualization logic to manage multiple VMs.

In an example embodiment, components/modules of admin/communication engine 155 are implemented using standard programming techniques. In other embodiments, admin/communication engine 155 may be implemented as instructions processed by a VM that executes as one of other programs 318.

Furthermore, in some embodiments, some or all of the components of admin/communication engine 155 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for dynamic resource allocation are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method for performing network address administration and management in federated cloud computing networks, the method comprising:
    registering a first network interface card (NIC) in a local network services appliance with a local cloud network, the local cloud network having a first physical computing system comprising a first network switch;
    registering a second NIC in a remote network services appliance with a remote cloud network, the remote cloud network having a second physical computing system comprising a second network switch;
    configuring the local cloud network to send, to the first registered NIC, a first packet with a first unclaimed network address, the first unclaimed network address having a first destination address the first network switch has not learned;
    configuring the remote cloud network to send, to the second registered NIC, a second packet with a second unclaimed network address, the second unclaimed network address having a second destination address the second network switch has not learned;
    upon registering the first NIC and the second NIC and configuring the local cloud network and the remote cloud network, forming, between the local network services appliance and the remote network services appliance, a layer-2 (L2) network tunnel by stitching the local cloud network and the remote cloud network, the L2 network tunnel comprising a data channel and a control channel;
    performing network address allocation, network address administration, and network address management in the federated cloud computing networks using the control channel in the L2 network tunnel;
    obtaining the first packet with the first unclaimed network address from the local cloud network;
    tunneling the obtained first packet, via the formed data channel in the L2 network tunnel, to the remote network services appliance by the local network services appliance;
    obtaining the second packet with the second unclaimed network address from the remote cloud network; and
    tunneling the second packet, via the formed data channel in the L2 network tunnel, to the local network services appliance by the remote network services appliance.

2. The method of claim 1, wherein a network address comprises an internet protocol (IP) address or a media access control (MAC) address.

3. The method of claim 1, wherein the control channel in the L2 network tunnel comprises a secure socket layer (SSL) virtual private network (VPN) tunnel.

4. The method of claim 1, wherein the network address administration and management comprises internet protocol (IP) address administration and management (IPAM) or media access control (MAC) address administration and management.

5. The method of claim 1, further comprising:
    performing, by one of the local network services appliance or the remote network services appliance, one or more of the following operations: sharing network address allocation requests, negotiating the network address allocation requests, and broadcasting the network address allocation requests; and
    ensuring, by the one of the local network services or the remote network services appliance, non-allocation of duplicate network addresses in the local cloud network and the remote cloud network via the control channel in the L2 network tunnel.

6. The method of claim 5, further comprising:
    sharing network address administration and management information between the local network services appliance and the remote network services appliance via the formed control channel in the L2 network tunnel.

7. The method of claim 5, further comprising:
    assigning, by the one of the local network services or the remote network services appliance, new network addresses to VMs in the local cloud network or the remote cloud network upon receiving a request.

8. The method of claim 5, further comprising:
    assigning, by the one of the local network services or the remote network services appliance, new network addresses to VMs in at least one of the local cloud network and the remote cloud network by blocking a network address from a delegated range upon receiving a request.

9. The method of claim 5, further comprising:
expiring, by the one of the local network services or the remote network services appliance, leases on relinquished network addresses; and
renewing, by the one of the local network services or the remote network services appliance, leases on existing network addresses.

10. The method of claim 5, further comprising:
not allocating network address blocks for VMs that are no longer available, are deleted, or are suspended by one of the local network services or the remote network services appliance, via the control channel in the L2 network tunnel.

11. The method of claim 5, further comprising:
addressing, by the one of the local network services or the remote network services appliance, remote dynamic host configuration protocol (DHCP) requests via the control channel in the L2 network tunnel.

12. The method of claim 5, further comprising:
resolving names locally, by the one of the local network services or the remote network services appliance using the control channel in the L2 network tunnel, if local domain name system (DNS) cache has a forwarding network address;
routing, by the one of the local network services or the remote network services appliance, packets to Internet via a local Internet gateway; and
routing, by the one of the local network services or the remote network services appliance, file transfer protocol (FTP)/file share requests to an available local server.

13. A non-transient computer-readable storage medium including instructions that are configured, when executed by a computing system, to perform a method for network address administration and management in federated cloud computing networks, the method comprising:
registering a first network interface card (NIC) in a local network services appliance with a local cloud network, the local cloud network having a first physical computing system comprising a first network switch;
registering a second NIC in a remote network services appliance with a remote cloud network having a second physical computing system comprising a second network switch;
configuring the local cloud network to send, to the first registered NIC, a first packet with a first unclaimed network address, the first unclaimed network address having a first destination address the first network switch has not learned;
configuring the remote cloud network to send, to the second registered NIC, a second packet with a second unclaimed network address, the second unclaimed network address having a second destination address the second network switch has not learned;
upon registering the first NIC and the second NIC and configuring the local cloud network and the remote cloud network, forming, between the local network services appliance and the remote network services appliance, an L2 network tunnel by stitching the local cloud network and the remote cloud network, the L2 network tunnel comprising a data channel and a control channel;
performing network address allocation, network address administration, and network address management in the federated cloud computing networks using the formed control channel in the L2 network tunnel;
obtaining the first packet with the first unclaimed network address from the local cloud network;
tunneling the obtained first packet, via the formed data channel in the L2 network tunnel, to the remote network services appliance by the local network services appliance;
obtaining the second packet with the second unclaimed network address from the remote cloud network; and
tunneling the second packet, via the formed data channel in the L2 network tunnel, to the local network services appliance by the remote network services appliance.

14. The non-transient computer-readable storage medium of claim 13, wherein a network address comprises Internet Protocol (IP) address or media access control (MAC) address.

15. The non-transient computer-readable storage medium of claim 13, wherein the control channel in the L2 network tunnel comprises a secure socket layer (SSL) virtual private network (VPN) tunnel.

16. The non-transient computer-readable storage medium of claim 13, wherein the network address administration and management comprises IP address administration and management (IPAM) or media access control (MAC) address administration and management.

17. The non-transient computer-readable storage medium of claim 13, further comprising:
sharing network address administration and management information between the local network services appliance and the remote network services appliance via the formed control channel L2 network tunnel.

18. A computing system for performing network address administration and management in federated cloud computing networks, the system comprising:
at least one local cloud network having a first physical computing system comprising a first network switch, the first physical computing system hosting a first set of multiple virtual machines (VMs) and a local network services appliance; and
at least one remote cloud network having a second physical computing system comprising a second network switch, the second physical computing system hosting a second set of multiple VMs and a remote network services appliance; and
an admin/communication engine that is configured to perform network address allocation, network address administration, and network address management in the federated cloud computing networks, by:
registering a first network interface card (NIC) in the local network services appliance with the local cloud network;
registering a second NIC in the remote network services appliance with the remote cloud network;
configuring the local cloud network to send, to the first registered NIC, a first packet with a first unclaimed network address, the first unclaimed network address having a first destination address the first network switch has not learned;
configuring the remote cloud network to send, to the second registered NIC, a second packet with a second unclaimed network address, the second unclaimed network address having a second destination address the second network switch has not learned;

upon registering the first NIC and the second NIC and configuring the local cloud network and the remote cloud network, forming, between the local network services appliance and the remote network services appliance, a layer-2 (L2) network tunnel by stitching the at least one local cloud network and the at least one remote cloud network, the L2 network tunnel comprising a data channel and a control channel;

performing the network address allocation, the network address administration, and the network address management in the federated networks using the formed control channel in the L2 network tunnel;

obtains the first packet with the first unclaimed network address from the local cloud network;

tunnels the first packet via the formed data channel in the L2 network tunnel to the remote network services appliance;

obtains the second packet with the second unclaimed network address from the remote cloud network; and tunnels the second packet via the formed data channel in the L2 network tunnel to the local network services appliance.

19. The computing system of claim 18, wherein a network address comprises Internet Protocol (IP) address or media access control (MAC) address.

20. The computing system of claim 18, wherein the control channel in the L2 network tunnel comprises a secure socket layer (SSL) virtual private network (VPN) tunnel.

21. The computing system of claim 18, wherein the network services appliance comprises an edge router.

22. The computing system of claim 18, wherein the network address administration and management comprises IP address administration and management (IPAM) or media access control (MAC) address administration and management.

23. The computing system of claim 18, wherein one of the local network services appliance and the remote network services appliance:

performs operations selected from one or more of the following: sharing network address allocation requests, negotiating network address allocation requests, and broadcasting network address allocation requests, and ensures non-allocation of duplicate network addresses in the local cloud network and the remote cloud network via the control channel in the L2 network tunnel.

24. The computing system of claim 18, wherein the one of the local network services appliance and the remote network services appliance shares network address administration and management information between the local network services appliance and the remote network services appliance via the formed control channel in the L2 network tunnel.

25. The computing system of claim 24, wherein the one of the local network services appliance and the remote network services appliance assigns new network addresses to at least one of VMs in the local cloud network and the remote cloud network upon receiving a request.

26. The computing system of claim 24, wherein the one of the local network services appliance and the remote network services appliance:

assigns new network addresses to at least one of VMs in the local cloud network and the remote cloud network by:

blocking a network address from delegated range; and communicating back to the one of the local network services appliance and the remote network services appliance upon receiving a request.

27. The computing system of claim 25, wherein the one of the local network services appliance and the remote network services appliance:

expires leases of relinquished network addresses; and renews leases of any existing network addresses.

28. The computing system of claim 25, wherein the one of the local network services appliance and the remote network services appliance unallocates network address blocks for VMs that are no longer available, are deleted, or are suspended via the control channel in the L2 network tunnel.

29. The computing system of claim 25, wherein the one of the local network services appliance and the remote network services appliance addresses remote dynamic host configuration protocol (DHCP) requests via the control channel in the L2 network tunnel.

30. The computing system of claim 25, wherein the one of the local network services appliance and the remote network services appliance resolves names locally via the control channel in the L2 network tunnel if local domain name system (DNS) cache has a forwarding network, wherein the one of the local network services appliance and the remote network services appliance routes file transfer protocol (FTP)/file share requests to an available local server.

* * * * *